(12) United States Patent
Yu et al.

(10) Patent No.: US 10,386,647 B1
(45) Date of Patent: *Aug. 20, 2019

(54) MAGNETIC INTERPUPILLARY DISTANCE ADJUSTMENT

(71) Applicant: Facebook, Inc., Menlo Park, CA (US)

(72) Inventors: Michael Xingyi Yu, Mountain View, CA (US); Mark Alan Tempel, Issaquah, WA (US)

(73) Assignee: Facebook, Inc., Menlo Park, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 15/647,112

(22) Filed: Jul. 11, 2017

(51) Int. Cl.
*G02B 27/02* (2006.01)

(52) U.S. Cl.
CPC .......... *G02B 27/028* (2013.01); *G02B 27/02* (2013.01); *G02B 27/022* (2013.01)

(58) Field of Classification Search
CPC .......... G02B 23/18; G02B 27/0172; G02B 27/0176; G02B 27/017; G02B 27/22; G02B 27/283; G02B 27/028; G02B 2027/0178; G02B 2027/0132; G02B 2027/0127; G02B 2027/0138; G02B 2027/2228; G02B 2027/225; G02B 7/12; G02C 7/081
USPC ......................................................... 359/480
See application file for complete search history.

(56) References Cited

U.S. PATENT DOCUMENTS

| | | | | |
|---|---|---|---|---|
| 5,318,183 A * | 6/1994 | Cohen | ................ | B65D 77/0493 206/528 |
| 5,327,664 A * | 7/1994 | Rothbart | ................ | A43B 7/14 36/174 |
| 5,351,819 A * | 10/1994 | Varon | ................ | B65D 5/48024 206/232 |
| 5,368,790 A * | 11/1994 | Greshes | ................ | B29C 43/021 264/2.4 |
| 5,453,009 A * | 9/1995 | Feldman | ................ | A61C 19/00 433/215 |
| 6,369,952 B1 * | 4/2002 | Rallison | ............... | G02B 27/017 359/630 |
| 7,542,210 B2 * | 6/2009 | Chirieleison, Sr. | ......................... | G02B 27/0093 345/8 |
| 8,223,024 B1 * | 7/2012 | Petrou | .................. | G02B 27/017 340/573.1 |
| 9,603,517 B2 * | 3/2017 | Lee | ....................... | A61B 3/0041 |
| 10,133,076 B2 * | 11/2018 | Wheelwright | ........... | G02B 3/06 |
| 10,162,182 B2 * | 12/2018 | Jepsen | ............... | G02B 27/0172 |
| 10,198,978 B2 * | 2/2019 | Richards | ................ | G09G 3/006 |

(Continued)

*Primary Examiner* — William R Alexander
*Assistant Examiner* — Tamara Y. Washington
(74) *Attorney, Agent, or Firm* — Kilpatrick Townsend & Stockton LLP

(57) ABSTRACT

Disclosed herein are techniques for adjusting the interpupillary distance (IPD) of an optical device. A system for IPD adjustment includes a first nonmoving component, a sliding assembly comprising a button, and a pair of magnets, wherein a first magnet of the pair of magnets is coupled to the sliding assembly. The pair of magnets is configured to exert a magnetic force on the sliding assembly in a first direction to press the sliding assembly against the first nonmoving component to lock the sliding assembly to the first nonmoving component. The sliding assembly is configured to, when the button of the sliding assembly is pushed by a force in a second direction opposite the first direction of the magnetic force, disengage with the first nonmoving component and become slidable with respect to the first nonmoving component.

20 Claims, 11 Drawing Sheets

(56) References Cited

U.S. PATENT DOCUMENTS

| | | | |
|---|---|---|---|
| 10,201,273 B2* | 2/2019 | Choukroun | A61B 3/111 |
| 10,203,566 B2* | 2/2019 | Shi | G02F 1/1362 |
| 10,209,524 B2* | 2/2019 | Drinkwater | G02B 27/0176 |
| 10,222,635 B2* | 3/2019 | Fonte | G06F 16/22 |
| 2017/0168303 A1* | 6/2017 | Petrov | G02B 27/0176 |
| 2018/0095635 A1* | 4/2018 | Valdivia | G02B 27/0093 |
| 2018/0338130 A1 | 11/2018 | Miller et al. | |
| 2019/0066316 A1* | 2/2019 | Bardagjy | G06T 7/521 |

* cited by examiner

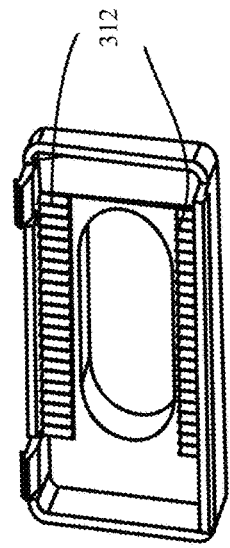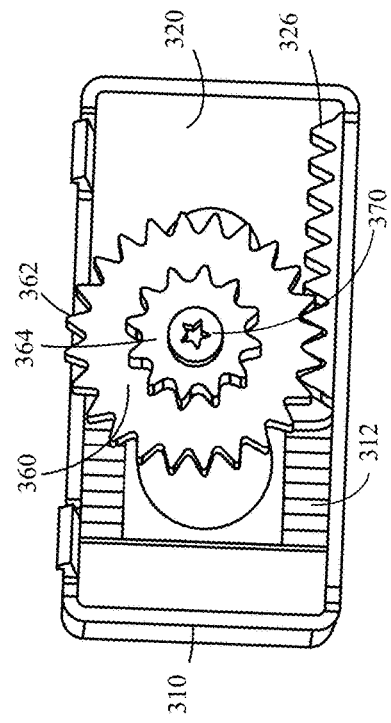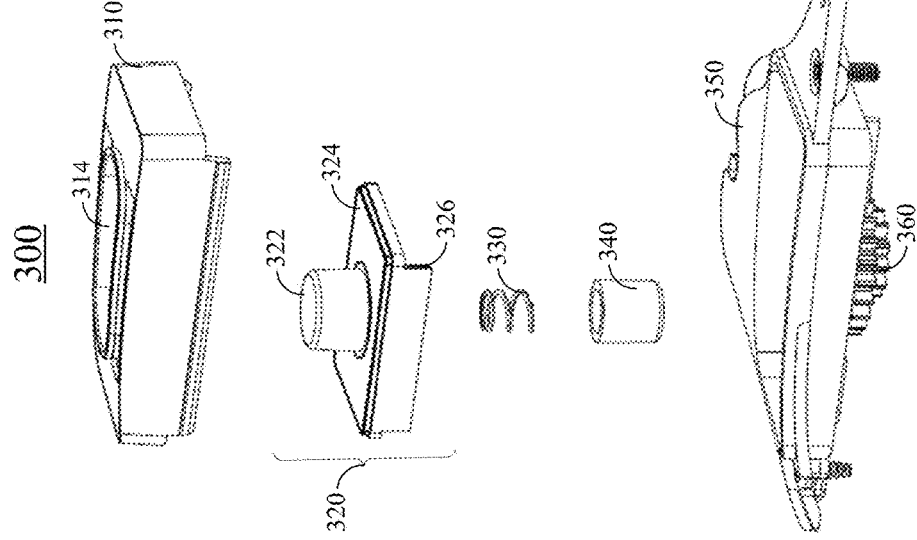
FIG. 3B
FIG. 3C
FIG. 3A

MAGNETIC INTERPUPILLARY DISTANCE ADJUSTMENT

BACKGROUND

The present disclosure generally relates to head-mounted display (HMD) devices, and more specifically to HMD devices with an adjustable interpupillary distance (IPD).

People have different interpupillary distances. For comfortable use of an HMD device, it is advantageous to have a mechanism in the HMD device for adjusting the interpupillary distance of the HMD device for use by different users. In at least some HMD devices with an adjustable IPD, when the IPD of the HMD device is adjusted, some components of the HMD device with relative movement between them may be in contact with each other, and thus the frictions between such components may cause abrasion on at least some of these components and may cause wear out of at least some of these components.

SUMMARY

The present disclosure generally relates to techniques for adjusting the interpupillary distance (IPD) of an optical device. For example, one or more embodiments of the optical device may use a magnetic force (rather than other types of forces that may only be applied through physical contact, such as forces exerted by elastic materials) to hold a sliding assembly for IPD adjustment in position when the optical device is in use. To adjust the IPD, a manual force may be applied by a user to counter the magnetic force and unlock the sliding assembly, which may then be slid with respect to a nonmoving component of the optical device to adjust the IPD. The magnetic force can be applied using a pair of magnets, where one magnet may be embedded in or attached to the sliding assembly, while the other magnet may be embedded in or attached to the nonmoving component. The pair of magnets may be selected such that an air gap may exist between the sliding assembly and the nonmoving component after the manual force is applied to unlock the sliding assembly. Thus, the sliding assembly may be moved with respect to the nonmoving component with little or no friction between them.

In some embodiments, a system for IPD adjustment may include a first nonmoving component, a sliding assembly comprising a button, and a pair of magnets, wherein a first magnet of the pair of magnets is coupled to the sliding assembly. The pair of magnets may be configured to exert a magnetic force, in a first direction, on the sliding assembly to press the sliding assembly against the first nonmoving component to lock the sliding assembly to the first nonmoving component. The sliding assembly may be configured to, when the button of the sliding assembly is pushed by a force in a second direction opposite the first direction of the magnetic force, disengage with the first nonmoving component and become slidable with respect to the first nonmoving component.

In some embodiments, the system for IPD adjustment may include a second nonmoving component. The sliding assembly may be positioned between the first nonmoving component and the second nonmoving component. The second magnet of the pair of magnets may be coupled to the second nonmoving component, and like poles of the first magnet and the second magnet face each other, wherein the magnetic force repels the sliding assembly towards the first nonmoving component. In some implementations, the first magnet and the second magnet may be configured such that, when the force in the second direction is below a threshold value, the sliding assembly and the second nonmoving component is separated by an air gap. In some implementations, the first nonmoving component may include a slot. A first part of the button may be received in the slot, and a second part of the button extends above the first nonmoving component through the slot. The sliding assembly, the first nonmoving component, and the second nonmoving component may be configured such that, when a top surface of the button aligns with a top circumference of the slot, the sliding assembly and the second nonmoving component is separated by an air gap.

In some embodiments, the system for IPD adjustment may include a gear. The sliding assembly may further include a gear rack, and the gear may mesh with the gear rack of the sliding assembly and may be rotatable by a movement of the gear rack of the sliding assembly. In some implementations, the gear may be coupled to a display assembly, and rotating the gear by the movement of the gear rack of the sliding assembly may cause a movement of the display assembly for the IPD adjustment.

In some embodiments of the system for IPD adjustment, the sliding assembly may further comprise a friction pad, and the first nonmoving component may comprise a surface with a plurality of teeth. The magnetic force may press the friction pad against the plurality of teeth to lock the sliding assembly to the first nonmoving component. In some implementations, the friction pad may comprise a material with an elasticity greater than a threshold value. In some implementations, the sliding assembly may be configured to be slidable in a direction different from the second direction after the button is pressed by the force in the second direction.

In some embodiments of the system for IPD adjustment, the pair of magnets may comprise at least one of a permanent magnet or a electromagnet. In some implementations, at least one of the pair of magnets may have an elongated shape. In some implementations, a second magnet of the pair of magnets may be coupled to the first nonmoving component, and opposite poles of the first magnet and the second magnet may face each other, and thus the magnetic force may attract the sliding assembly to the first nonmoving component to lock the sliding assembly.

In certain embodiments, an optical device may include one or more display assemblies, and an interpupillary distance (IPD) adjustment system coupled to the one or more display assemblies. The IPD adjustment system may include a first nonmoving component, a sliding assembly comprising a button, and a pair of magnets, wherein a first magnet of the pair of magnets is coupled to the sliding assembly. The pair of magnets may be configured to exert a magnetic force, in a first direction, on the sliding assembly to press the sliding assembly against the first nonmoving component to lock the sliding assembly to the first nonmoving component. The sliding assembly may be configured to, when the button of the sliding assembly is pushed by a force in a second direction opposite the first direction of the magnetic force, disengage with the first nonmoving component and become slidable with respect to the first nonmoving component.

In certain embodiments, a method for adjusting an interpupillary distance of an optical device may include pressing, by a pair of magnets, a sliding assembly against a first nonmoving component of an interpupillary distance (IPD) adjustment system to engage the sliding assembly with the first nonmoving component, and, in response to pressing the sliding assembly by a user, disengaging the sliding assembly from the first nonmoving component. The method may also include applying, by the pair of magnets, a magnetic repulsion force or a magnetic attraction force on the sliding assembly to prevent the sliding assembly being pressed from contacting a second nonmoving component. The method may further include, in response to sliding the sliding assembly relative to the first nonmoving component by the user, causing a rotation of a gear meshed with a gear rack on the sliding assembly, wherein the rotation of the gear causes a movement of a display assembly to adjust the IPD.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures:

FIG. 3A is a exploded view illustrating some components of an example IPD adjustment system, according to certain embodiments;

FIG. 3B is a rear view of a top cover of the example IPD adjustment system shown in FIG. 3A, according to certain embodiments;

FIG. 3C is a perspective view of some components of the example IPD adjustment system shown in FIG. 3A, according to certain embodiments;

DETAILED DESCRIPTION

Figure 1:
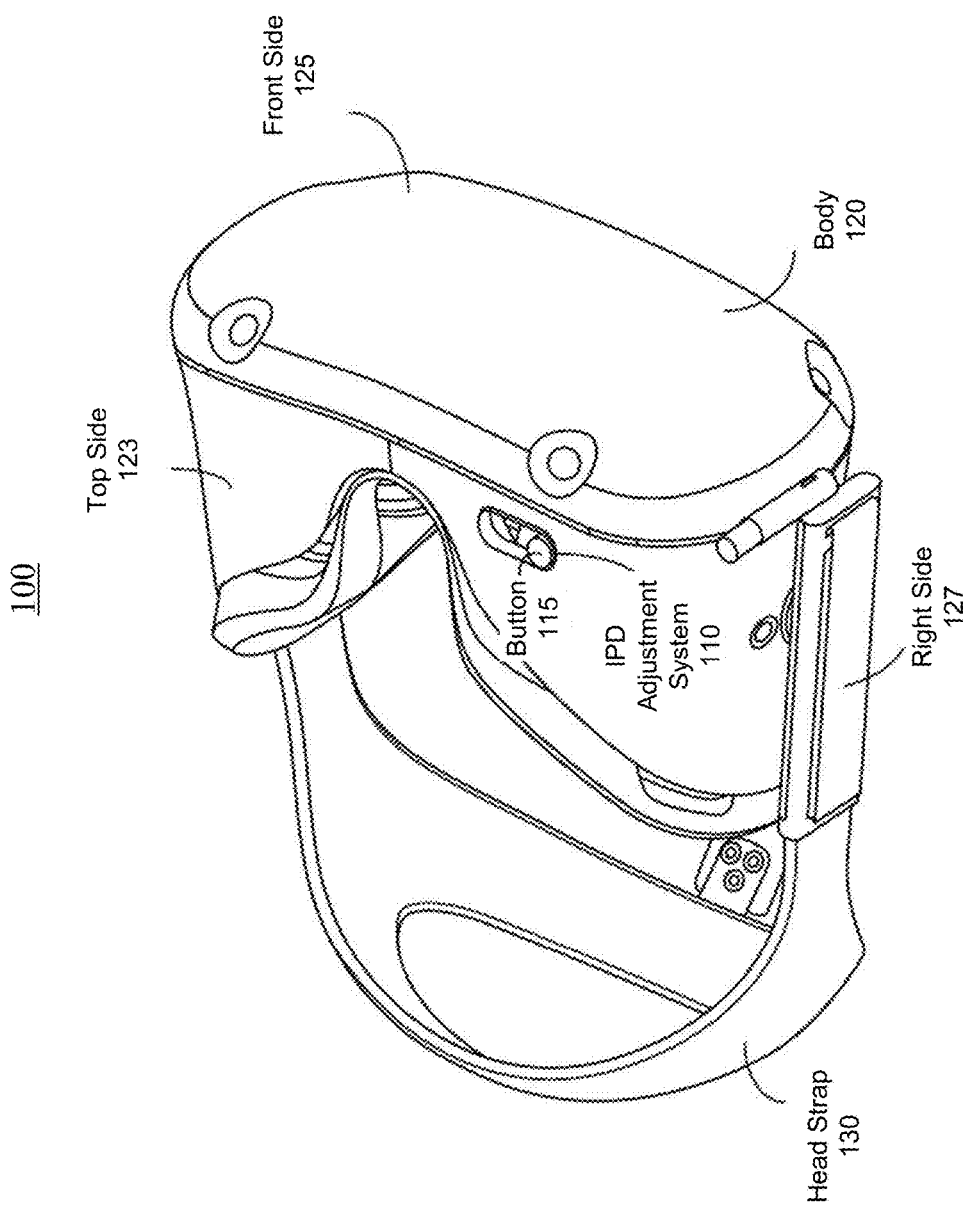
FIG. 1 is a perspective view of a head-mounted display (HMD) device including an interpupillary distance (IPD) adjustment system, according to certain embodiments.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof.

A binocular viewing system, such as a binocular microscope, a night vision goggle (NVGs), or a head-mounted display (HMD) device, may include two viewing (or display) assemblies for providing images to two eyes of a user of the binocular viewing system, respectively. Each viewing assembly may have an exit pupil, which is a virtual aperture in the viewing assembly. Only image light passing through this virtual aperture can exit the viewing assembly and enter the eye of the user. The interpupillary distance (IPD) of the binocular viewing system is thus the distance between the centers of the two exit pupils. Interpupillary distance of a person is the distance between the centers of two pupils of two eyes of the person. Each person may have his or her own interpupillary distance. For example, the IPD of human eyes may vary from about 50 mm to over 75 mm. It is desirable that both eye pupils of the user are positioned within the exit pupils of the binocular viewing system. In other words, it is desirable that the IPD of the binocular viewing system matches the IPD of a user's eyes. For example, for a binocular viewing system with small exit pupils, such as a binocular microscope, if its interpupillary distance does not match the IPD of a user's eyes, two images may be seen by the user through the eyepieces. It is thus desirable to adjust the IPD of the viewing system until the two images overlap with each other for comfortable use of the viewing system. For viewing systems that may be used for an extended period of time, such as an HMD device, it is even more advantageous to have a mechanism for adjusting the interpupillary distance for different users to prevent or reduce uncomfortableness or fatigue over the extended viewing period.

An IPD adjustment system may thus be desired on a binocular viewing system, such as an HMD device, for adjusting the interpupillary distance of the HMD device through relative movement of the two viewing (or display) assemblies. In some HMD devices with an adjustable IPD, when the IPD of the HMD device is being adjusted, some components of the HMD device with relative movement may be in contact with each other, and thus the friction between such components may cause abrasion or wear out on at least some of these components.

Techniques disclosed herein use a magnetic force (rather than other types of force that may only be applied through physical contact, such as forces exerted using elastic materials) to lock a sliding assembly for IPD adjustment on an optical device when the optical device is in use. To adjust the IPD, a manual force may be applied by a user to counter the magnetic force and unlock the sliding assembly, which may then be slid with respect to a nonmoving component of the optical device to adjust the IPD. The magnetic force can be applied using a pair of magnets, where one magnet may be embedded in or attached to the sliding assembly, while the other magnet may be embedded in or attached to the nonmoving component. The pair of magnets may be selected such that an air gap may exist between the sliding assembly and the nonmoving component when the manual force is applied to unlock the sliding assembly. Thus, the sliding assembly may be slid with respect to the nonmoving component with little or no friction between them.

In one implementation, an IPD adjustment system may include a top cover, a sliding assembly, a bottom cover, and a gear. The IPD adjustment system may also include a pair of magnets, where one magnet may be at least partially embedded in or attached to the sliding assembly, and the other magnet may be at least partially embedded in or attached to the bottom cover. The top cover may form a slot and has a surface with teeth ("friction rack"). The sliding assembly may include a button, a friction pad, and a gear rack. At least a part of the button is received in the slot formed by the top cover. At least a part of the button that is not received in the slot is exposed to the user. The friction pad of the sliding assembly may have a surface facing the friction rack of the top cover. The magnetic force between the pair of magnets may repel the sliding assembly towards the top cover and press the friction pad of the sliding assembly against the friction rack of the top cover to prevent movement of the sliding assembly relative to the top cover.

In certain implementations, to adjust the IPD, a manual force may be applied by a user to counter the magnetic repulsion force and unlock the sliding assembly, which may then be slid with respect to the top cover and/or the bottom cover to adjust the IPD. Because the gear rack is attached to or included in the sliding assembly, the gear rack may move with the sliding assembly. The moving of the gear rack may rotate the gear that meshes with the gear rack. The rotation of the gear may cause relative movement of the display assemblies, resulting in the adjustment of the interpupillary distance in the HMD device.

In some implementations, the magnetic repulsion force may be strong enough such that the sliding assembly may be kept at a distance away from the bottom cover (i.e., a gap may exist between the sliding assembly and the bottom cover) even after the manual force is applied. Thus, the sliding assembly may be slid with little or no friction between the sliding assembly and the bottom cover. As a result, little or no physical wear-out of the sliding assembly and/or the bottom cover may occur.

FIG. 1 is a perspective view of an example HMD device 100 including an IPD adjustment system 110, according to certain embodiments. HMD device 100 may be part of, e.g., a virtual reality (VR) system, an augmented reality (AR) system, a mixed reality (MR) system, or some combinations thereof. HMD device 100 may include a body 120 and a head strap 130. FIG. 1 shows a top side 123, a front side 125, and a right side 127 of body 120 in the perspective view. Head strap 130 may have an adjustable or extendible length. There may be a sufficient space between body 120 and head strap 130 of HMD device 100 for allowing a user to mount HMD device 100 onto the user's head. In various embodiments, HMD device 100 may include additional, fewer, or different components. For example, in some embodiments, HMD device 100 may include eyeglasses temples and temples tips, rather than head strap 130.

HMD device 100 may present to a user media including virtual and/or augmented views of a physical, real-world environment with computer-generated elements. Examples of the media presented by HMD device 100 may include images (e.g., two-dimensional (2D) or three-dimensional (3D) images), videos (e.g., 2D or 3D videos), audios, or some combinations thereof. The images and videos may be presented to each eye of the user by one or more display assemblies (not shown in FIG. 1) enclosed in body 120 of HMD device 100. In various embodiments, the one or more display assemblies may include a single electronic display panel or multiple electronic display panels (e.g., one display panel for each eye of the user). Examples of the electronic display panel(s) may include, for example, a liquid crystal display (LCD), an organic light emitting diode (OLED) display, an inorganic light emitting diode (ILED) display, a micro light emitting diode (mLED) display, an active-matrix organic light emitting diode (AMOLED) display, a transparent organic light emitting diode (TOLED) display, some other display, or some combinations thereof. HMD device 100 may include two eye box regions. The eye box regions may include exit pupils of the display assemblies. The distance between the centers of the exit pupils of two display assemblies of HMD device 100 is the interpupillary distance of HMD device 100.

In the implementation shown in FIG. 1, IPD adjustment system 110 is located on top side 123 of body 120 of HMD device 100. In alternative implementations, IPD adjustment system 110 may be located at a different location on HMD device 100. IPD adjustment system 110 may include an exposed button 115 that can be pushed and slid by the user. The sliding of button 115 may cause rotations of a gear in IPD adjustment system 110, and the rotation of the gear may in turn cause relative movement between the display assemblies of HMD device 100 to adjust the IPD of HMD device 100 in a continuous manner to match the interpupillary distance of a user. The amount of IPD adjustment may be determined by the distance that the user slides button 115.

Figure 2:
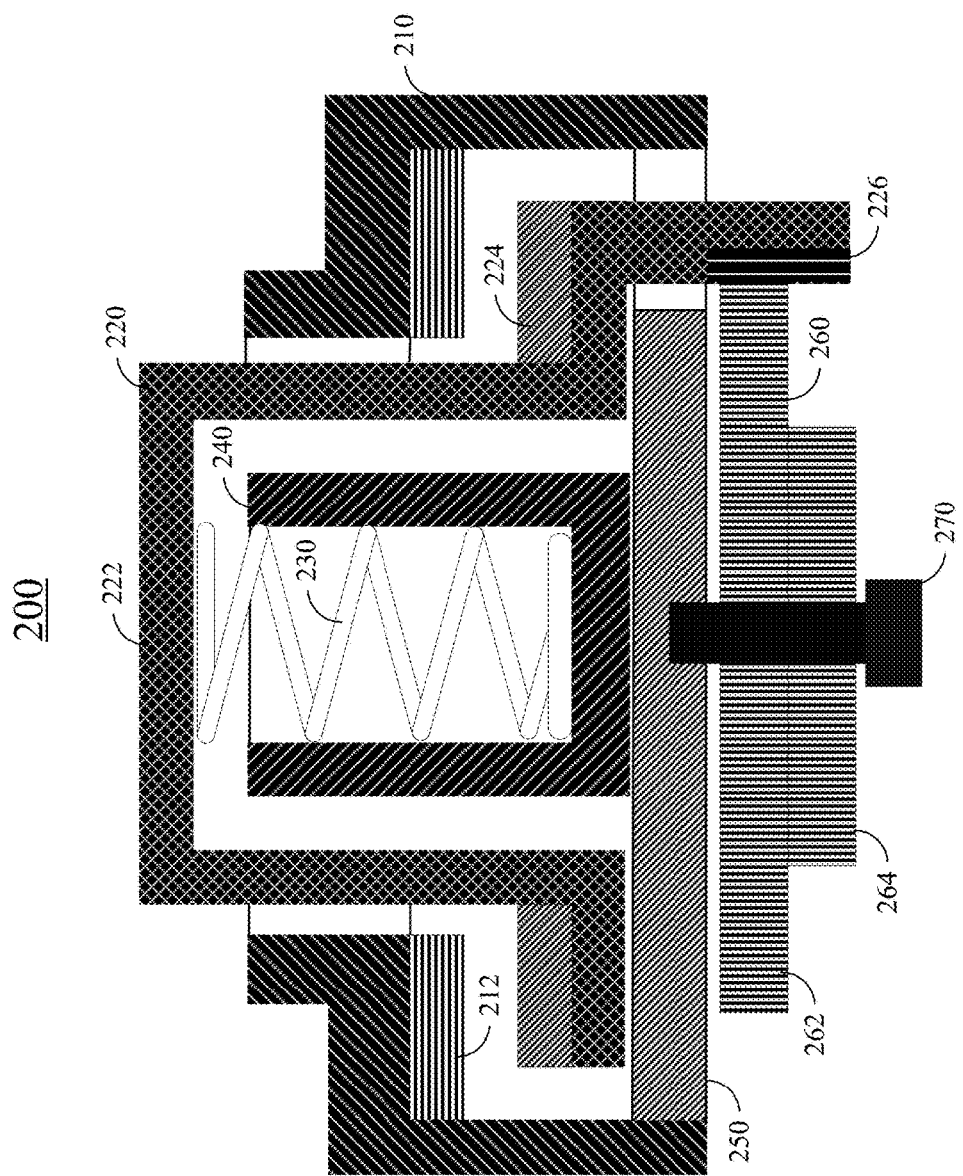
FIG. 2 is a simplified cross-sectional view illustrating at least some components of an example IPD adjustment system, according to certain embodiments.

FIG. 2 is a simplified cross-sectional view illustrating at least some components of an example IPD adjustment system 200. IPD adjustment system 200 may be used as IPD adjustment system 110 in HMD device 100. IPD adjustment system 200 may include a top cover 210, a sliding assembly 220, a spring 230 in a spring plunger 240, a bottom cover 250 coupled to top cover 210, and a gear 260 coupled to sliding assembly 220 and bottom cover 250 through a gear stud 270. Top cover 210 may be coupled to bottom cover 250 through a locking mechanism to form a housing that can receive sliding assembly 220. Top cover 210 may include a slot and may have a surface with teeth ("friction rack" 212). Sliding assembly 220 may include a button 222, a friction pad 224, and a gear rack 226. At least a part of button 222 is received in the slot in top cover 210. At least a part of button 222 is not received in the slot and is exposed to the user. Friction pad 224 of sliding assembly 220 may face friction rack 212 of top cover 210.

Spring 230 may push sliding assembly 220 towards top cover 210, such that friction pad 224 may be in contact with friction rack 212. Friction pad 224 may include a layer of rubber, nylon, or any other material with an elasticity beyond a threshold value. The teeth on friction rack 212 may be stiff. For example, the teeth may be made of a stiff polymer, metal, or ceramic. When spring 230 pushes sliding assembly 220 towards top cover 210, at least some of the teeth on friction rack 212 may engage with friction pad 224, which may deform to resist the force from the teeth. The engagement between the teeth on friction rack 212 and friction pad 224 may lock sliding assembly 220 and prevents sliding assembly 220 from moving relative to top cover 210.

As shown in FIG. 2, button 222 of sliding assembly 220 may be pushed down and compress spring 230. When being pushed down sufficiently, button 222 and therefore sliding assembly 220 may be unlocked from top cover 210 as friction rack 212 disengages with friction pad 224. Thus, sliding assembly 220 can be slid with respect to top cover 210 and bottom cover 250 in the housing formed by top cover 210 and bottom cover 250.

Bottom cover 250 may include a slot that can receive gear rack 226 of sliding assembly 220. Gear rack 226 may mesh with a cogwheel 262 of gear 260. When gear rack 226 moves with sliding assembly 220, gear rack 226 may rotate gear 260 through cogwheel 262. The rotation of gear 260 may cause motions of one or more display assemblies coupled to gear 260 through a cogwheel 264, resulting in the adjustment of the interpupillary distance of the HMD device.

FIG. 3A is a exploded view illustrating some components of an example IPD adjustment system 300, according to certain embodiments. IPD adjustment system 300 may be a specific implementation of IPD adjustment system 200. As illustrated in FIG. 3A, IPD adjustment system 300 may include a top cover 310, a sliding assembly 320, a spring 330, a spring sleeve 340, a bottom cover 350, and a gear 360. Sliding assembly 320 may be inserted into top cover 310 from the bottom of top cover 310. Spring 330 may be housed by spring sleeve 340, and may be enclosed in a hollow button 322 of sliding assembly 320. Top cover 310 may be coupled and locked to bottom cover 350 through one or more slots on bottom cover 350. Top cover 310 and bottom cover 350 may form a cavity that can accommodate sliding assembly 320, spring 330, and spring sleeve 340. Gear 360 may be attached to the bottom of bottom cover 350 through a gear stud (not shown in FIG. 3A). In some implementations, IPD adjustment system 300 may include fewer, additional, or different components. For example, IPD adjustment system 300 may not include spring sleeve 340. In some implementations, the shape of top cover or bottom cover may be different from the shape of top cover 310 or bottom cover 350 shown in FIG. 3A.

Top cover 310 may be fixed on top side 123 of body 120 or another portion of HMD device 100. Top cover 310 may not move relative to the HMD device 100 with the movement of other components of IPD adjustment system 110. Top cover 310 may include a slot 314 and a friction rack 312 with multiple teeth, as shown in FIG. 3B and described in detail below. The teeth on friction rack 312 may be stiff. For example, the teeth may be made of a stiff polymer, metal, or ceramic.

Sliding assembly 320 may include button 322, a gear rack 326, and a friction pad 324. At least a part of button 322 extends through slot 314 of top cover 310, so that button 322 can be exposed to the user of the HMD device. Gear rack 326 may be coupled to button 322, such that gear rack 326 may move with button 322, as described below in detail with respect to FIG. 3C. Friction pad 324 has a surface that faces friction rack 312 of top cover 310. Friction pad 324 may include a layer of rubber, nylon, or any other material with an elasticity beyond a threshold value.

Spring 330 may bias sliding assembly 320 towards top cover 310 and press friction pad 324 of sliding assembly 320 against friction rack 312 of top cover 310 when button 322 is not pressed. Friction pad 324 can thus grip the teeth on friction rack 312 of top cover 310 to prevent movement of sliding assembly 320 relative to the top cover 310 or bottom cover 350. In some implementations, spring 330 may be a compression spring that is designed to operate with a compression load, so that spring 330 may become shorter when the compression load is applied to it. Thus, when the user presses button 322, spring 330 is compressed, and button 322 can be pushed into slot 314 and away from top cover 310. When button 322 is pushed beyond a threshold distance (i.e., spring 330 is pressed beyond the threshold distance), sliding assembly 320 (more specifically, friction pad 324) may disengage from top cover 310 (more specifically, friction rack 312) and may allow sliding assembly 320 to slide with respect to top cover 310. For example, the user may slide button 322 (and therefore sliding assembly 320) along the long axis of slot 314 of top cover 310. In some implementations, the outer diameter of spring 330 may be no larger than the inner diameter of button 322 so that spring 330 can be received in the hollow portion of button 322 with spring sleeve 340 between spring 330 and the inner wall of button 322. Spring 330 may have a shape of a cylinder, cone, hour glass, battery, or barrel, or have reduced ends.

Bottom cover 350 may include one or more slots for receiving and locking top cover 310. Bottom cover 350 may also include a recess. Bottom cover 350 may also include a slot, through which gear rack 326 of sliding assembly 320 may pass.

Gear 360 may include a center hole. A gear stud 370 (not shown in FIG. 3A) may be inserted into the center hole of gear 360 and coupled to bottom cover 350 through a threaded hole on the bottom side of bottom cover 350. Gear stud 370 may rotatably fix gear 360 to bottom cover 350. Gear 360 and gear stud 370 can be made of a metal, polymer, or composite material, or any combination thereof.

FIG. 3B is a rear view of top cover 310 of IPD adjustment system 300 shown in FIG. 3A, according to certain embodiments. As shown in FIG. 3B, friction rack 312 may include one or two arrays of teeth arranged along the prolonged direction of top cover 310. In some other implementations, friction rack 312 may include teeth on a larger or smaller portion of top cover 310. When no external force is applied to button 322, sliding assembly 320 may be pressed against top cover 310 by spring 330 such that friction rack 312 may bite into friction pad 324 of sliding assembly 320 and prevents friction pad 324 (and hence, sliding assembly 320) from sliding relative to top cover 310.

FIG. 3C is a perspective view of some components of the IPD adjustment system 300 shown in FIG. 3A, according to certain embodiments. As illustrated in FIG. 3C, gear 360 may include two cogwheels 362 and 364 that are fixedly attached together and share the same center of rotation. In some implementations, cogwheels 362 and 364 may be a single piece. Thus, when one of the two cogwheels 362 and 364 rotates, the other cogwheel would rotate at the same time with the same angular velocity. Cogwheel 362 may be closer to bottom cover 350 and may have a larger radius than cogwheel 364. Cogwheel 362 may mesh with an array of cogs on gear rack 326 of sliding assembly 320. When button 322 is pressed and slid with respect to top cover 310, the movement of gear rack 326 may cause cogwheel 362 to rotate around its center of rotation, which may in turn cause the rotation of cogwheel 364 that is fixedly coupled to cogwheel 362. The rotation of cogwheel 364 may cause one or more display assemblies to move, thus changing the IPD of the HMD device.

Figure 4:
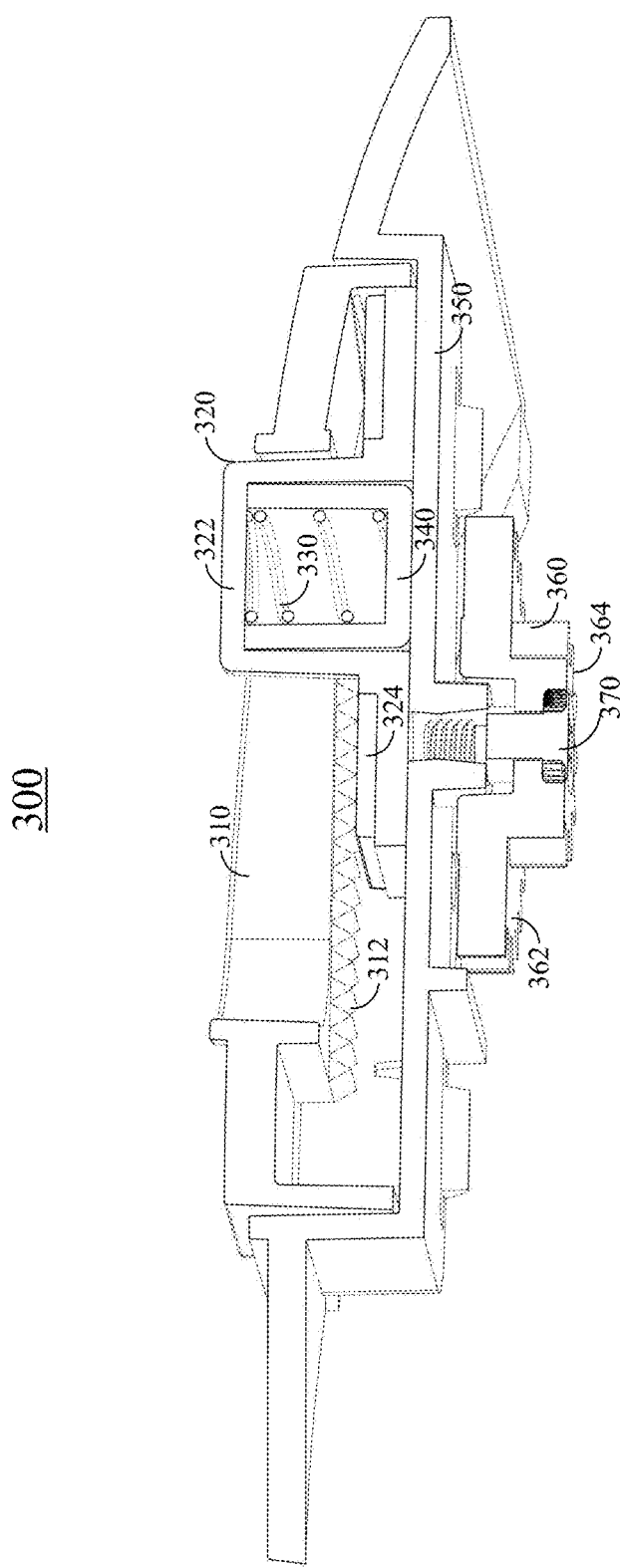
FIG. 4 is a cross-sectional view illustrating at least some components of the IPD adjustment system shown in FIG. 3A, according to certain embodiments.

FIG. 4 is a cross-sectional view illustrating at least some components of IPD adjustment system 300 shown in FIG. 3A, according to certain embodiments. As shown in FIG. 4, in the assembled state, sliding assembly 320 may be at least partially housed in a cavity formed by top cover 310 and bottom cover 350. Sliding assembly 320 may have friction pad 324 facing friction rack 312 of top cover 310. In FIG. 4, button 322 is fully pushed down and spring 330 of IPD adjustment system 300 is compressed. Thus, sliding assembly 320 (more specifically friction pad 324) moves down and disengages with top cover 310 (more specifically, friction rack 312). As such, the teeth of friction rack 312 do not press friction pad 324, and sliding assembly 320 is unlocked from the nonmoving top cover 310 and/or bottom cover 350. The user can then slide button 322, which may then cause gear rack 326 (not shown in FIG. 4) to rotate gear 360 through cogwheel 362 to adjust the interpupillary distance. Once an appropriate interpupillary distance is achieved, the user may release button 322. Upon releasing of button 322, spring 330 may rebound and push sliding assembly 320 including friction pad 324 up to engage with top cover 310 again. The engagement of the teeth on friction rack 312 with friction pad 324 may again lock sliding assembly 320 to prevent sliding assembly 320 from moving relative to top cover 310 and bottom cover 350. Thus, the interpupillary distance may be kept at the appropriate value.

As can be seen from FIG. 4, the bottom surface of spring sleeve 340 and/or the bottom surface of button 322 (when pushed down) may contact the top surface of bottom cover 350. When sliding assembly 320 is slid with respect to top cover 310 and bottom cover 350 to adjust the IPD, spring sleeve 340, which may be positioned in the hollow portion of button 322, may move with sliding assembly 320. Thus, the relative movement between spring sleeve 340 (and/or sliding assembly 320) and bottom cover 350 that are in contact with each other may cause abrasion and/or wear out on the contacting surfaces of spring sleeve 340, bottom cover 350, and/or sliding assembly 320. Furthermore, the friction between spring sleeve 340 (and/or sliding assembly 320) and bottom cover 350 may render the sliding of sliding assembly 320 not as smooth as desired.

According to some embodiments of the present disclosure, an optical device may include an IPD adjustment system that can reduce or avoid the friction and wear-out when the IPD is adjusted. The IPD adjustment system may include a sliding assembly, which may be in the form of, for example, a button as shown in FIG. 3A. The sliding assembly may include a first magnet (e.g., attached to or at least partially embedded in the sliding assembly). The IPD adjustment system may also include a first nonmoving component that may include a second magnet. The second magnet may be attached to or at least partially embedded in the first nonmoving component. The first magnet and the second magnet may be arranged such that the north magnetic pole of the first magnet may face the north magnetic pole of the second magnet, or the south magnetic pole of the first magnet may face the south magnetic pole of the second magnet. As a result, the sliding assembly may be repelled by the magnetic repulsion force away from the first nonmoving component of the IPD adjustment system and engage with (or otherwise lock to), for example, a second nonmoving component of the IPD adjustment system.

To adjust the IPD of the optical device, the sliding assembly may be pushed towards the first nonmoving component to disengage the sliding assembly from the second nonmoving component. The decrease in distance between the sliding assembly and the first nonmoving component may cause the magnetic repulsion force to increase nonlinearly, until the magnetic repulsion force is equal to the manual force exerted by the user when pushing the sliding assembly (i.e., an equilibrium condition is achieved). The first magnet and the second magnet may be configured such that, for a typical exerted manual force, the equilibrium condition may be achieved after the sliding assembly disengages with the second nonmoving component, but before the sliding assembly is in contact with the first nonmoving component (i.e., a gap exists between the sliding assembly and the first nonmoving component). Thus, the sliding assembly may be slid relative to the first and second nonmoving components with little or no friction (and wear-out of the components). In some implementations, at least one of the first magnet or the second magnet may be large enough (e.g., elongated) to extend within or beyond the sliding range of the sliding assembly, such that a magnetic repulsion force (and thus an equilibrium condition) may be maintained when the sliding assembly is pushed and slid within the sliding range.

Figure 5:
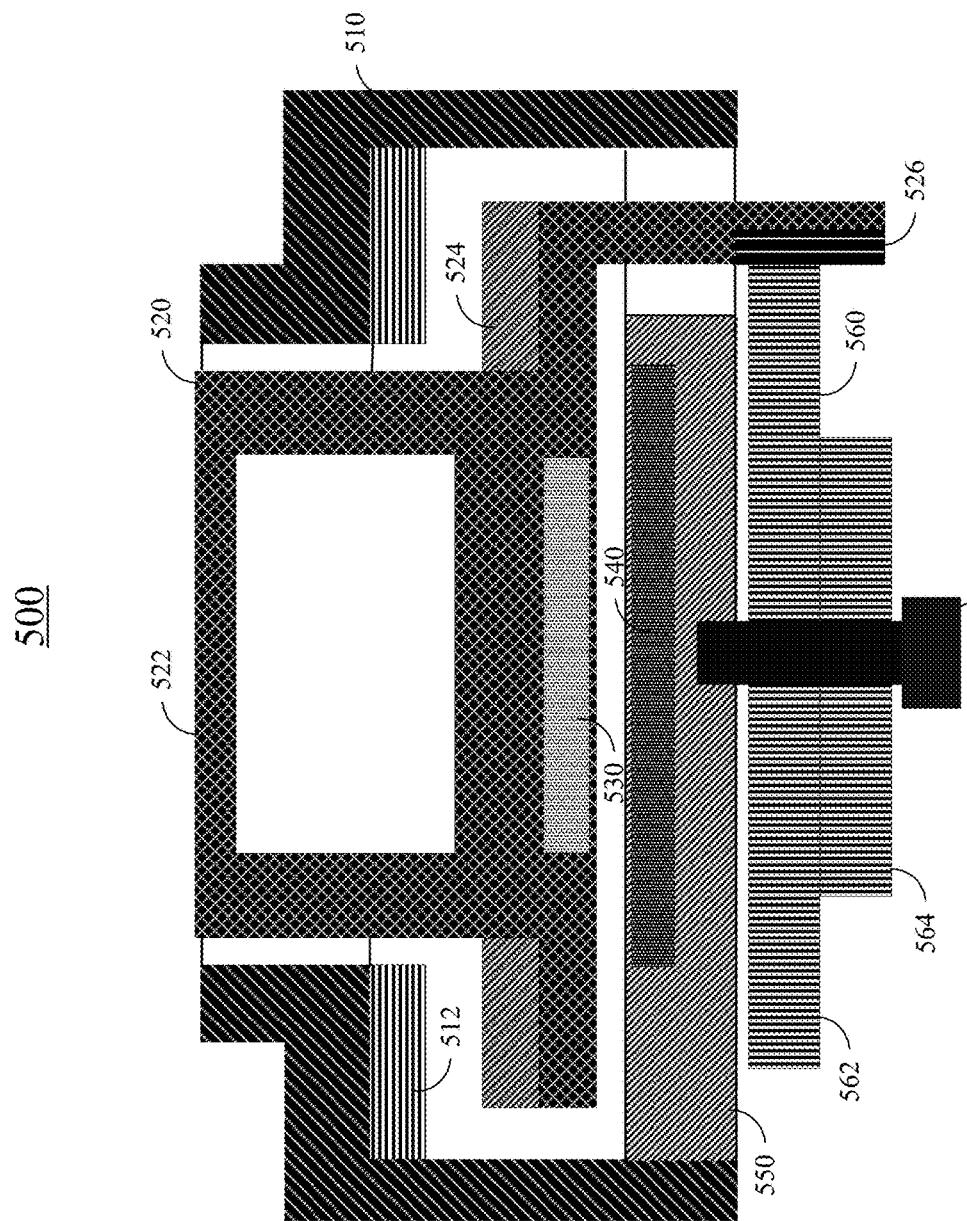
FIG. 5 is a simplified cross-sectional view illustrating at least some components of an example IPD adjustment system, according to certain embodiments.

FIG. 5 is a cross-sectional view illustrating at least some components of an example IPD adjustment system 500, according to certain embodiments. As IPD adjustment system 200, IPD adjustment system 500 may be used as IPD adjustment system 110 in HMD device 100 or other optical devices. IPD adjustment system 500 may include a top cover 510, a sliding assembly 520, a bottom cover 550 coupled to top cover 510, and a gear 560 coupled to sliding assembly 520 and coupled to bottom cover 550 through a gear stud 570. Top cover 510 may be similar to top cover 210 of FIG. 2 and may be coupled to bottom cover 550 through a locking mechanism to form a housing that can accommodate sliding assembly 520. Top cover 510 may include a slot and may have a surface with teeth ("friction rack" 512). Gear 560 may be similar to gear 260 of FIG. 2. Sliding assembly 520 may include a button 522, a friction pad 524, and a gear rack 526. At least a part of button 522 may be received in the slot of top cover 510. At least a part of button 522 is not received in the slot and is exposed to the user. As friction pad 224 and friction rack 212 of FIG. 2, friction pad 524 of sliding assembly 520 may face friction rack 512 of top cover 510.

Sliding assembly 520 may include or be coupled to a first magnet 530. In some embodiments, first magnet 530 may be embedded in button 522 or may be received in a cavity in button 522. First magnet 530 may have a shape of a circle, a rectangle, a polygon, an ellipse, or any other suitable shape. A second magnet 540 may be attached to, or at least partially embedded in, bottom cover 550. First magnet 530 and second magnet 540 may include, for example, a permanent magnet or a electromagnet. In one embodiment, the permanent magnet may be a neodymium magnet comprising a sintered alloy of Neodymium (Nd), Iron (Fe), and Boron (B) (NdFeB). In another embodiment, the permanent magnet may be an alnico or iron-nitride magnet. In some embodiments, the permanent magnet may include an inner core of highly permeable material, such as iron or permalloy (Ni—Fe—Mo) alloy, disposed inside the permanent magnet. The permanent magnet is "permanent" in that it is permanently magnetized, as opposed to having a magnetic field generated by an electrical current flowing into a coil wrapped around a core. The electromagnet may comprise a core (e.g., an iron core) and a winding wire (coil) and can be activated by passing a current through the winding wire. First magnet 530 and second magnet 540 may be arranged such that the north magnetic pole of first magnet 530 may face the north magnetic pole of second magnet 540, or the south magnetic pole of first magnet 530 may face the south magnetic pole of second magnet 540. As a result, sliding assembly 520 may be repelled towards top cover 510 by the magnetic repulsion force between first magnet 530 and second magnet 540, such that friction pad 524 may be pressed against friction rack 512. Friction pad 524 may include a layer of rubber, nylon, or any other material with an elasticity beyond a threshold value. The teeth on friction rack 512 may be stiff. For example, the teeth may be made of a stiff polymer, metal, or ceramic. At least some of the teeth on friction rack 512 may engage with friction pad 524, which may deform to resist the force from the teeth. The engagement of the teeth on friction rack 512 and friction pad 524 may lock sliding assembly 520 and prevent sliding assembly 520 from moving relative to top cover 510 and other nonmoving components of the optical device.

As shown in FIG. 5, button 522 of sliding assembly 520 may be pushed down by countering the magnetic repulsion force. When being pushed down sufficiently, button 522 (and therefore sliding assembly 520) may be unlocked from top cover 510 as friction rack 512 disengages with friction pad 524. Thus, sliding assembly 520 can be slid with respect to top cover 510 and bottom cover 550 in the housing formed by top cover 510 and bottom cover 550.

Bottom cover 550 may include a slot that can receive gear rack 526 of sliding assembly 520. Gear rack 526 may mesh with a cogwheel 562 of gear 560. When gear rack 526 moves with sliding assembly 520, gear rack 526 may rotate gear 560 through cogwheel 562. The rotation of gear 560 may cause motions of one or more display assemblies that are coupled to gear 560 through a cogwheel 564, resulting in the adjustment of the interpupillary distance of the optical device (e.g., an HMD device).

First magnet 530 and second magnet 540 may be selected such that the magnetic repulsion force is strong enough to push friction pad 524 against friction rack 512 and prevent sliding assembly 520 from moving relative to top cover 510 when little or no force is applied from the top of button 522 by a user. The magnetization and/or sizes of first magnet 530 and second magnet 540 may also be selected such that an air gap may exist between sliding assembly 520 and bottom cover 550 after the manual force is applied to unlock sliding assembly 520 from top cover 510.

Figure 6:
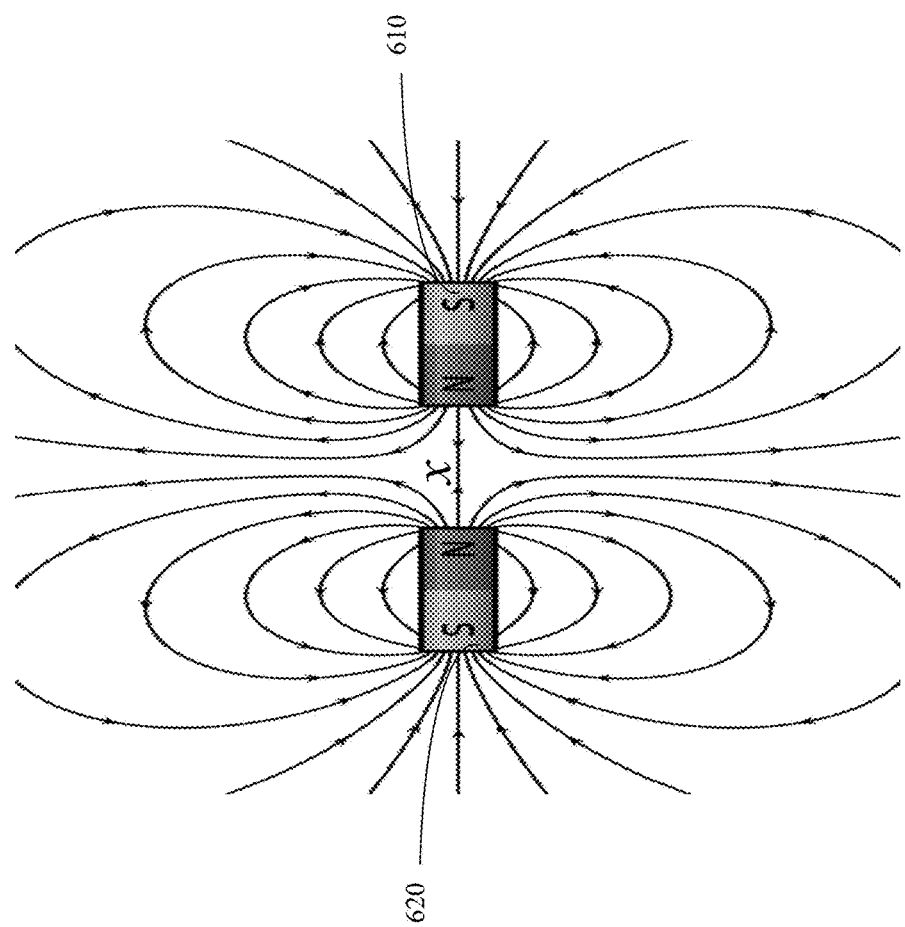
FIG. 6 illustrates an example arrangement of a pair of magnets, according to certain embodiments.

FIG. 6 illustrates an example arrangement of a pair of magnets 610 and 620 and the associated magnetic field, according to certain embodiments. Magnets 610 and 620 may be arranged such that the like poles are facing each other. The magnetic repulsion force between magnets 610 and 620 that are separated by a distance x may be estimated using an appropriate equation. For example, if magnets 610 and 620 are two identical cylindrical bar magnets and are placed end to end with a separation of x, the magnetic force F(x) between magnets 610 and 620 may be given by:

$$F(x) = \left[\frac{B_0^2 A^2 (L^2 + R^2)}{\pi \mu_0 L^2}\right]\left[\frac{1}{x^2} + \frac{1}{(x+2L)^2} - \frac{2}{(x+L)^2}\right],$$

where $B_0$ is the magnetic flux density near each pole in tesla (T); A is the area of each pole in square-meter (m²); L is the length of each magnet in meter (m); R is the radius of each magnet in m; and x is the separation between the two magnets in m. Magnetic flux density $B_0$ may be given by $B_0 = \mu_0 M/2$, where $\mu_0$ is the permeability of free space ($4\pi \times 10^{-7}$ T·m/A), and M is the magnetization in amperes per meter (A/m). For two cylindrical magnets with radius R, height h, and their magnetic dipole aligned and a separation greater than a certain limit, the magnetic force may be approximated by:

$$F(x) = \frac{\pi \mu_0}{4} M^2 R^4 \left[\frac{1}{x^2} + \frac{1}{(x+2h)^2} - \frac{2}{(x+h)^2}\right],$$

where M is the magnetization of the magnets and x is the separation between the magnets. When the separation x between the two magnets decreases, the magnetic repulsion force may increase exponentially. Thus, based on the desired magnetic repulsion forces at desired separations, magnets with appropriate magnetization and dimensions may be selected.

In some implementations, rather than or in addition to selecting the magnets to prevent contact between sliding assembly 520 (or first magnet 530) and bottom cover 550 (or second magnet 540) as described above, the physical dimensions of sliding assembly 520 and button 522 may be selected such that, when button 522 is pushed down to a position where the top surface of button 522 aligned with or slightly below the top surface or circumference of top cover 510, an air may still exist between sliding assembly 520 (or first magnet 530) and bottom cover 550 (or second magnet 540).

Figure 7:
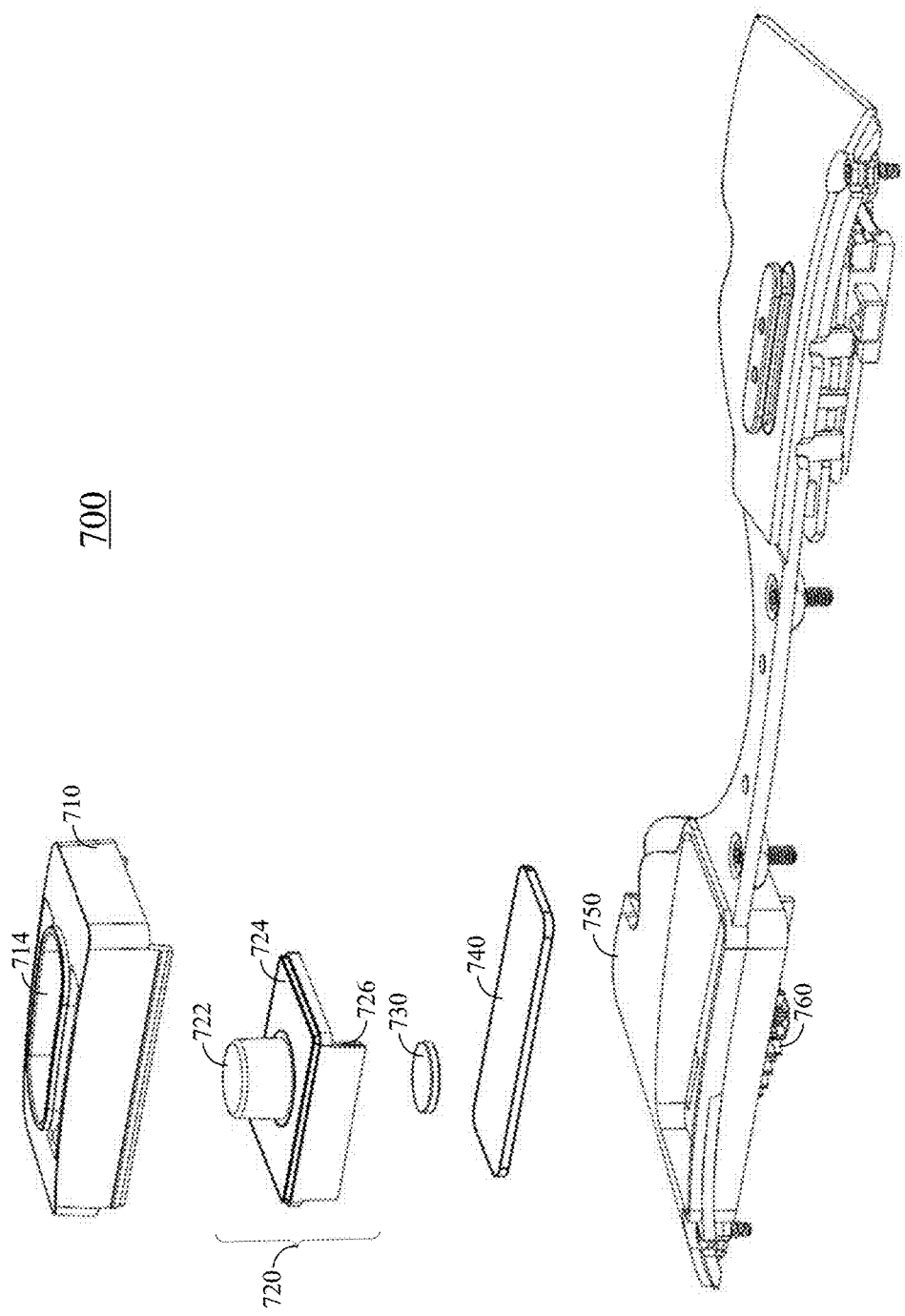
FIG. 7 is an exploded view illustrating some components of an IPD adjustment system, according to certain embodiments.

FIG. 7 is an exploded view illustrating some components of an example IPD adjustment system 700, according to certain embodiments. IPD adjustment system 700 may be one specific implementation of IPD adjustment system 500. As illustrated in FIG. 7, IPD adjustment system 700 may include a top cover 710, a sliding assembly 720, a first magnet 730, a second magnet 740, a bottom cover 750, and a gear 760. Top cover 710 may be coupled and locked to bottom cover 750 through one or more slots on bottom cover 750. Top cover 710 and bottom cover 750 may form a cavity that can accommodate sliding assembly 720, first magnet 730, and second magnet 740. Gear 760 may be attached to the bottom of bottom cover 750 through a gear stud (not shown in FIG. 7).

Top cover 710 may be fixed on top side 123 of body 120 or another portion of HMD device 100. Top cover 710 may not move relative to HMD device 100 with movement of other components of the IPD adjustment system 700. As shown in FIG. 7, top cover 710 may include a slot 714 and a friction rack 712 with multiple teeth (not shown in FIG. 7). The teeth on friction rack 712 may be stiff. For example, the teeth may be made of a stiff polymer, metal, or ceramic.

Sliding assembly 720 may include a button 722, a gear rack 726, and a friction pad 724. Sliding assembly 720 may be inserted into top cover 710 from the bottom of top cover 710. At least part of button 722 is received in slot 714 of top cover 710, so that button 722 can be exposed to the user of the HMD device. Gear rack 726 is coupled to button 722, such that gear rack 726 may move with button 722. Friction pad 724 may have a surface that faces friction rack 712 of top cover 710. Friction pad 724 may include a layer of rubber, nylon, or any other material with an elasticity greater than a threshold value.

First magnet 730 may be attached to sliding assembly 720. For example, first magnet 730 may be housed by or embedded into button 722 or other components of sliding assembly 720. In some embodiments, first magnet 730 may be received in a cavity in button 722. First magnet 730 may have a shape of a circle, a rectangle, a polygon, an ellipse, or any other suitable shape.

Bottom cover 750 may include one or more slots to receive and lock top cover 710. Bottom cover 750 may also include a slot, through which gear rack 726 of sliding assembly 720 may pass. Bottom cover 750 may further include a recess. Second magnet 740 may be placed in the recess and attached to bottom cover 750. For example, second magnet 740 may be glued to the bottom surface of the recess in bottom cover 750. In some implementations, second magnet 740 may also be at least partially embedded in bottom cover 750. Second magnet 740 may have a shape of a rectangle, a polygon, a circle, an ellipse, or any other suitable shape.

When first magnet 730 and second magnet 740 are arranged such that the like poles face each other, second magnet 740 may repel first magnet 730 and thus sliding assembly 720 towards top cover 710 and press friction pad 724 of sliding assembly 720 against friction rack 712 of top cover 710 when button 722 is not pressed. Friction pad 724 can thus grip the teeth on friction rack 712 of top cover 710 to prevent movement of sliding assembly 720 relative to the fixed top cover 710. When the user presses button 722 to counter the magnetic repulsion force and button 722 is pressed beyond a threshold distance, sliding assembly 720 (specifically, friction pad 724) may disengage from top cover 710 (specifically, friction rack 712) and allow sliding assembly 720 to slide with respect to top cover 710. For example, the user may slide button 722 (and therefore sliding assembly 720) along the long axis of slot 714 of top cover 710.

Gear 760 may include a center hole. A gear stud 770 (not shown in FIG. 7) may be inserted into the center hole of gear 760 and coupled to bottom cover 750 through a threaded hole on the bottom side of bottom cover 750. As a result, gear 760 may be rotatably fixed to bottom cover 750 by gear stud 770. Gear 760 and gear stud 770 can be made of a metal, polymer, or composite material, or any combination thereof.

In some implementations, IPD adjustment system 700 may include fewer, additional, or different components. For example, in certain implementations, IPD adjustment system 700 may also include a pad, gasket, or washer on second magnet 740 or bottom cover 750, such that first magnet 730 and second magnet 740 would not be in physical contact under any condition. In another example, the shape of the top cover or bottom cover may be different from the shape of top cover 710 or bottom cover 750 shown in FIG. 7.

Figure 8:
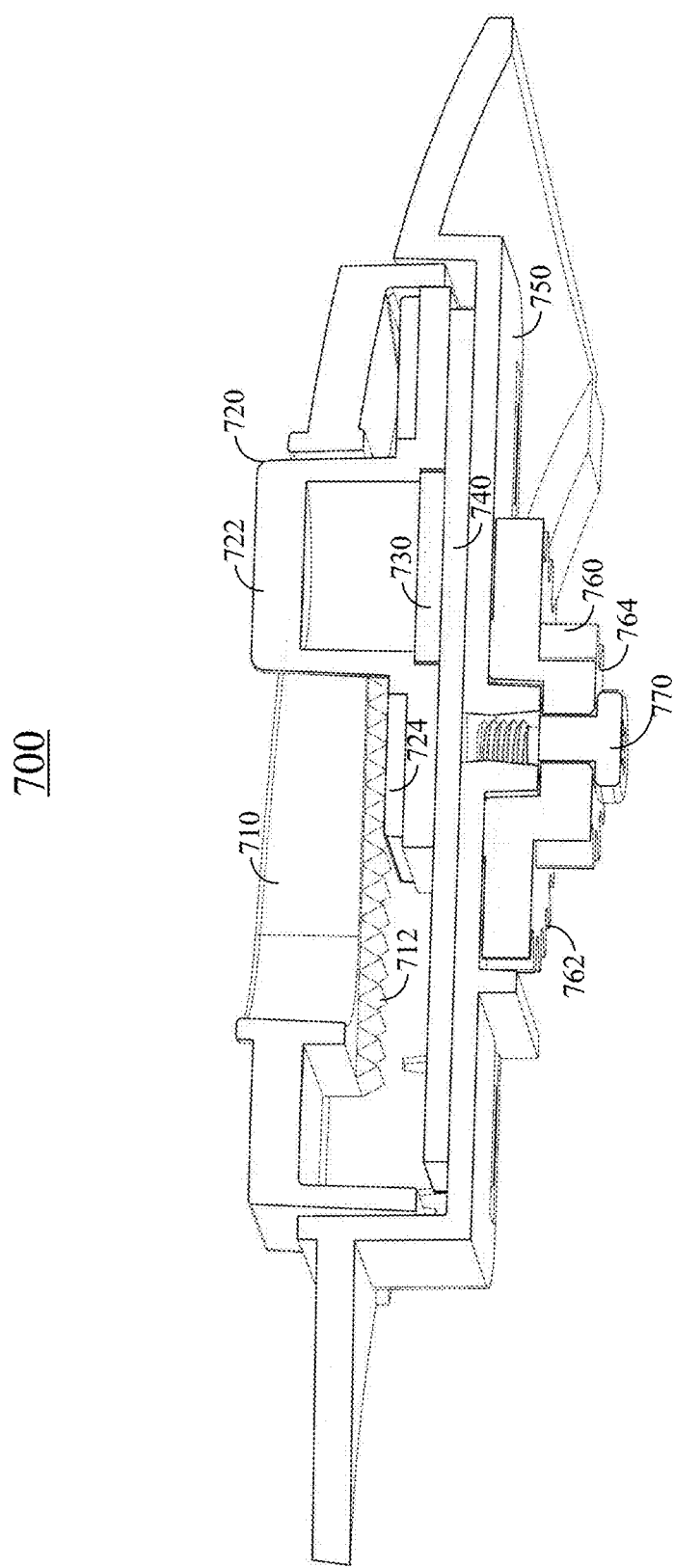
FIG. 8 is a cross-sectional view illustrating at least some components of the IPD adjustment system shown in FIG. 7, according to certain embodiments.

FIG. 8 is a cross-sectional view illustrating at least some components of the example IPD adjustment system 700 shown in FIG. 7, according to certain embodiments. As shown in FIG. 8, in the assembled state, sliding assembly 720 may be at least partially housed in a cavity formed by top cover 710 and bottom cover 750. Sliding assembly 720 may have friction pad 724 facing friction rack 712 of top cover 710. In the implementation shown in FIG. 8, gear 760 may include two cogwheels 762 and 764 that are fixedly attached together and share the same center of rotation. In some implementations, cogwheels 762 and 764 may be a single piece. Thus, when one of the two cogwheels 762 and 764 rotates, the other cogwheel would rotate at the same time with the same angular velocity. Cogwheel 762 may be closer to bottom cover 750 and may have a larger radius than cogwheel 764. Cogwheel 762 may mesh with an array of cogs on gear rack 726 of sliding assembly 720.

In FIG. 8, button 722 is pushed down, and thus sliding assembly 720 (more specifically, friction pad 724) may move down and disengage with top cover 710 (more specifically, friction rack 712). As such, the teeth of friction rack 712 may not press friction pad 724, and sliding assembly may be unlocked from the nonmoving top cover 710 and/or bottom cover 750. The user can then slide button 722 with respect to top cover 710, which may then cause gear rack 726 (not shown in FIG. 8) to rotate cogwheel 762. The rotation of cogwheel 762 may in turn cause the rotation of cogwheel 764. The rotation of the cogwheel 764 may cause one or more display assemblies to move, thus changing the IPD of the optical device (e.g., HMD device).

As described above, the magnetic repulsion force may increase exponentially when the separation between two magnets with like poles facing each other is reduced. Therefore, when first magnet 730 and second magnet 740 are close to each other as button 722 is pushed down, the magnetic repulsion force may be large enough to prevent button 722 from being pushed down further by the normal force exerted by a user's finger. As such, during normal use, there might always be an air gap between first magnet 730 (or sliding assembly 720) and second magnet 740 (or bottom cover 750) to prevent frictions between first magnet 730 (or sliding assembly 720) and second magnet 740 (or bottom cover 750) when the IPD is being adjusted, and thus the sliding of sliding assembly 720 may be smooth.

Once an appropriate interpupillary distance is achieved, the user may release button 722. Upon releasing of button 722, the magnetic repulsion force between first magnet 730 and second magnet 740 may push sliding assembly 720 up to engage with top cover 710 again. The engagement of the teeth on friction rack 712 and friction pad 724 may again lock sliding assembly 720 and prevent sliding assembly 720 from moving relative to top cover 710. Thus, the interpupillary distance may be kept at the appropriate value.

In various implementations, the pair of magnets (e.g., first magnet 530 and second magnet 540 of FIG. 5, or first magnet 730 and second magnet 740 of FIG. 7) may be arranged differently. For example, in some implementations of IPD adjustment system 500, first magnet 530 and second magnet 540 may replace friction pad 524 and friction rack 512, and may be coupled to or embedded in sliding assembly 520 and top cover 510, respectively.

Figure 9:
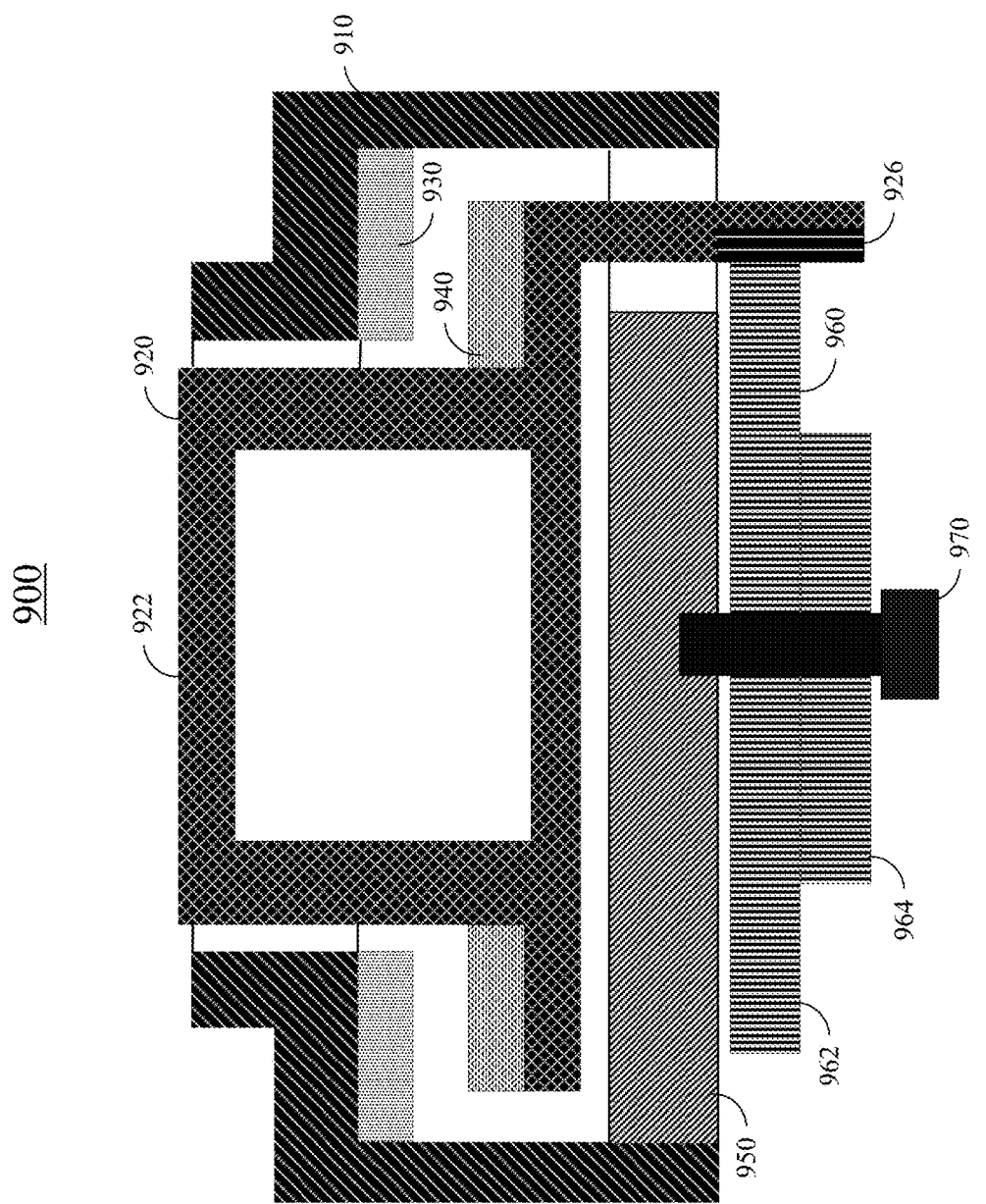
FIG. 9 is a simplified cross-sectional view illustrating at least some components of an example IPD adjustment system, according to certain embodiments.

FIG. 9 a cross-sectional view illustrating at least some components of an example IPD adjustment system 900, according to certain embodiments. IPD adjustment system 900 may include a top cover 910, a sliding assembly 920, a bottom cover 950 coupled to top cover 910 to form a cavity for housing sliding assembly 920, and a gear 960 coupled to bottom cover 950 through a gear stud 970. Top cover 910 may be coupled to or include a first magnet 930. Sliding assembly 920 may include or coupled to a second magnet 940. First magnet 930 and second magnet 940 may be arranged with opposite poles facing each other. Sliding assembly 920 may also include a button 922 and a gear rack 926. Button 922 and gear rack 926 may be similar to button 522 and gear rack 526 of FIG. 5, respectively. Gear 960 may be similar to gear 560 of FIG. 5 and may include a first cogwheel 962 and a second cogwheel 964. First cogwheel 962 may mesh with gear rack 926.

Because first magnet 930 and second magnet 940 are arranged with opposite poles facing each other, the attraction force between first magnet 930 and second magnet 940 may attract sliding assembly 920 to top cover 910, and thus lock sliding assembly 920 to top cover 910. To adjust the IPD, a user may push button 922 down to counter the attraction force between first magnet 930 and second magnet 940 so as to unlock sliding assembly 920 from top cover 910. When sliding assembly 920 is unlocked from top cover 910, sliding assembly 920 can be slid to adjust the IPD as described above with respect to, for example, FIGS. 5, 7, and 8.

The size of button 922 and the size and magnetization of first magnet 930 and second magnet 940 may be designed such that, even if button 922 is pressed down to a position where the top surface of button 922 aligns with a top surface (or circumference) of top cover 910, the attraction force between first magnet 930 and second magnet 940 may still be strong enough to prevent sliding assembly 920 from contacting bottom cover 950. As a result, when button 922 is pressed, sliding assembly 920 may not contact either top cover 910 or bottom cover 950, thus preventing frictions between sliding assembly 920 and top cover 910 or bottom cover 950.

In some implementations, at least one of top cover 910 or sliding assembly 920 may include a metal that can be attracted by a magnet, and the IPD adjustment system may only include one magnet on either top cover 910 or sliding assembly 920 that does not include the metal. The magnet may attract top cover 910 or sliding assembly 920 that includes the metal to lock sliding assembly 920 to top cover 910.

In some implementations, electromagnets comprising an iron core and a winding wire may be used. A switch may be turned on to pass an electric current through the winding wire to activate the electromagnets for locking or unlocking the sliding assembly, depending on, for example, the arrangement of the electromagnets and the direction of the electric current in the two electromagnets. The switch may be turned on or off by, for example, pushing or releasing the button (e.g., button 522 or 922). Thus, in some implementations, a user may press the button once to unlock the sliding assembly from the top or bottom cover, release the button, and then slide the sliding assembly without having to hold the button down. The user may press the bottom again to lock the sliding assembly once the desired IPD is achieved.

Figure 10:
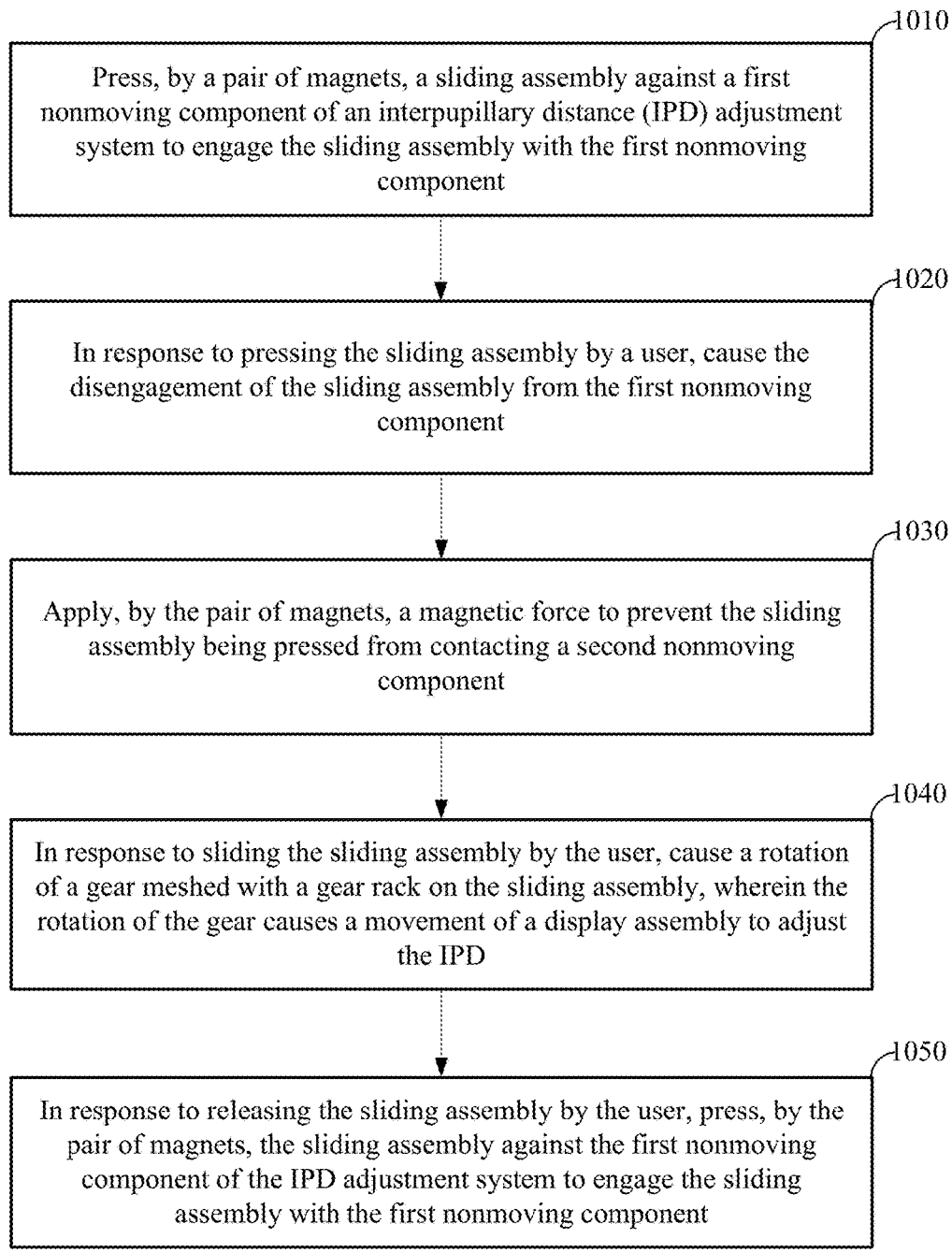
FIG. 10 is a flow chart illustrating an example method of adjusting the IPD of an HMD device, according to certain embodiments.

FIG. 10 is a flow chart 1000 illustrating an example method of adjusting the IPD of an optical device (e.g., an HMD device), according to certain embodiments. The optical device may include an IPD adjustment system, such as IPD adjustment system 500, 700, or 900 described above.

At block 1010, a pair of magnets of the IPD adjustment system, such as first magnet 530 and second magnet 540, first magnet 730 and second magnet 740, or first magnet 930 and second magnet 940, may press (repel or attract) a sliding assembly (e.g., sliding assembly 520, 720, or 920) of the IPD adjustment system against a first nonmoving component (e.g., top cover 510, 710, or 910) of the IPD adjustment system to engage the sliding assembly with the first nonmoving component. The pair of magnets may press the sliding assembly against the first nonmoving component by a magnetic repulsion force or a magnetic attraction force as described above. The engagement between the sliding assembly and the first nonmoving component may be through the magnetic attraction or through the engagement of a friction rack and a friction pad as described above.

At block 1020, in response to pressing the sliding assembly (e.g., a button on the sliding assembly) by a user to counter the magnetic force between the pair of magnets, the button and the sliding assembly may be pushed away from the first nonmoving component. The button and the sliding assembly may be pushed down beyond a threshold distance to cause the disengagement of the sliding assembly from the first nonmoving component. After the disengagement, the sliding assembly and the first nonmoving component may be separated by an air gap.

At block 1030, while the button and the sliding assembly are pressed by the user, the pair of magnets may exert a magnetic force to prevent the sliding assembly being pressed from contacting a second nonmoving component, such as bottom cover 550, 750, or 950. For example, the magnetic force may be a magnetic repulsion force as described above with respect to FIGS. 5, 7, and 8. The magnetic force may also be a magnetic attraction force as described above with respect to FIG. 9. The pair of magnets may be selected such that an air gap may exist between the sliding assembly and the second nonmoving component when the sliding assembly is unlocked as described above.

At block 1040, in response to sliding the sliding assembly by the user, the sliding assembly may cause a rotation of a gear meshed with a gear rack on the sliding assembly. The rotation of the gear may in turn cause the movement of one or more display assemblies to adjust the IPD. Because an air gap may exist between the sliding assembly and the first nonmoving component or between the sliding assembly and the second nonmoving component, the sliding of the sliding assembly would not cause any friction between the sliding assembly and the first nonmoving component or between the sliding assembly and the second nonmoving component. Thus, the sliding could be smooth and would not cause wear out on either the sliding assembly or the first or second nonmoving component.

At block 1050, the user may release the sliding assembly after a desired IPD is achieved. In response to releasing the sliding assembly by the user, the pair of magnets may again press the sliding assembly against the first nonmoving component of the IPD adjustment system to engage the sliding assembly with the first nonmoving component. When the sliding assembly engages with the first nonmoving component, the sliding assembly may be locked to the first nonmoving component to prevent movement of the sliding assembly with respect to the first nonmoving component and other nonmoving components of the optical device. Thus, the IPD may be kept at the desired distance.

It is noted that even though FIG. 9 describes the operations as sequential processes, some of the operations may be performed in parallel or concurrently. In addition, the order of the operations may be rearranged. An operation may have additional steps not included in the figure. Some operations may be optional, and thus may be omitted in various embodiments. Some operations described in one block may be performed together with operations at another block. Furthermore, embodiments of the methods may be implemented in hardware, software, firmware, middleware, microcode, hardware description languages, or any combination thereof.

As described above, various general purpose or special purpose devices may be used to implement some of the methods or perform some of the operations disclosed herein. The devices may be portable (e.g., a mobile phone or a laptop computer) or stationary (e.g., a general purpose desktop computer or a server). Some devices may include some or all components for performing some or all operations disclosed herein. Some devices may be combined with one or more other devices to perform some or all operations disclosed herein.

Figure 11:
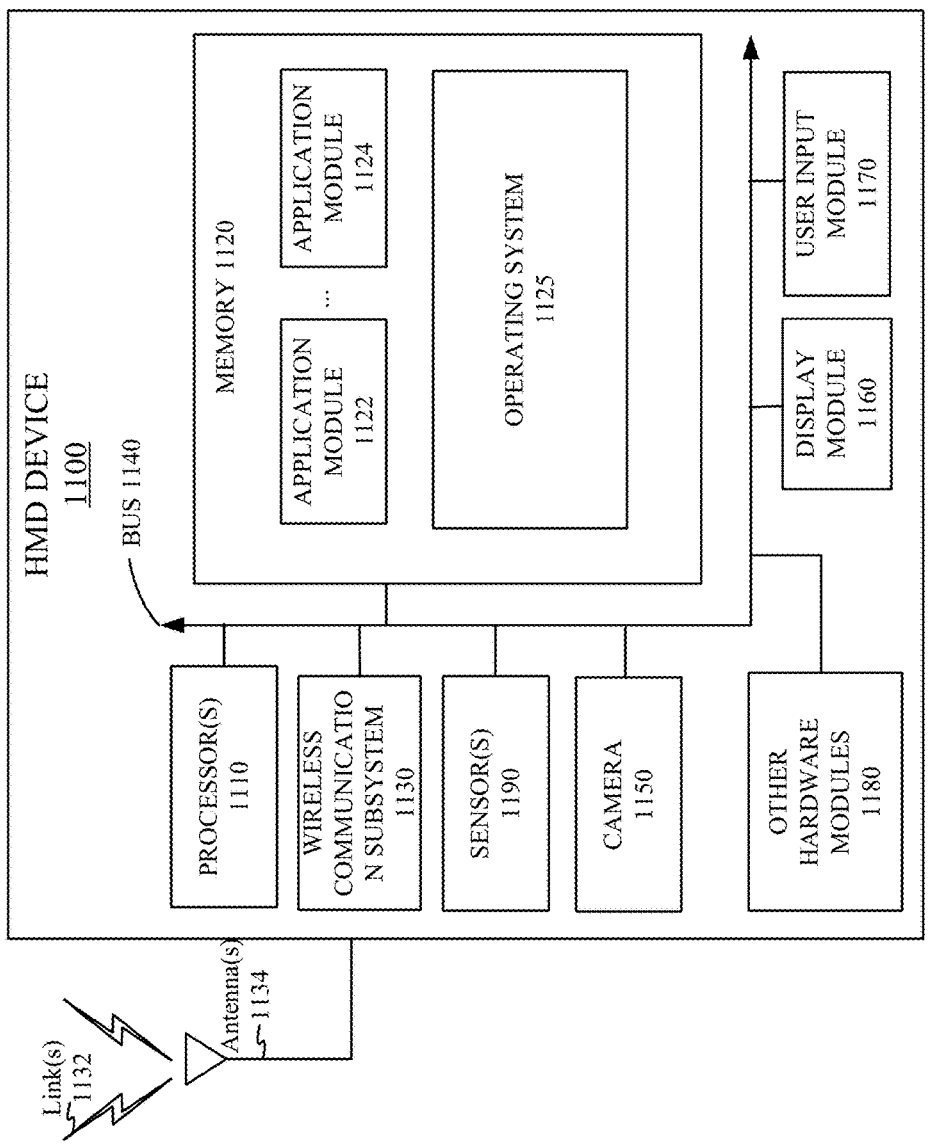
FIG. 11 is a simplified block diagram of an electronics system of an example HMD device for implementing some of the examples disclosed herein.

FIG. 11 is a simplified block diagram of an electronic system of an example HMD device 1100 for implementing some of the examples disclosed herein. HMD device 1100 may be used to implement HMD device 100. In this example, HMD device 1100 may include one or more processor(s) 1110 and a memory 1120. Processor(s) 1110 may be configured to execute instructions for performing operations at a number of components, and can be, for example, a general-purpose processor or microprocessor suitable for implementation within a portable electronic device. Processor(s) 1110 may be communicatively coupled with a plurality of components within HMD device 1100. To realize this communicative coupling, processor(s) 1110 may communicate with the other illustrated components across a bus 1140. Bus 1140 may be any subsystem adapted to transfer data within HMD device 1100. Bus 1140 may include a plurality of computer buses and additional circuitry to transfer data.

Memory 1120 may be coupled to processor(s) 1110. In some embodiments, memory 1120 may offer both short-term and long-term storage and may be divided into several units. Memory 1120 may be volatile, such as static random access memory (SRAM) and/or dynamic random access memory (DRAM) and/or non-volatile, such as read-only memory (ROM), flash memory, and the like. Furthermore, memory 1120 may include removable storage devices, such as secure digital (SD) cards. Memory 1120 may provide storage of computer readable instructions, data structures, program modules, and other data for HMD device 1100. In some embodiments, memory 1120 may be distributed into different hardware modules. A set of instructions and/or code might be stored on memory 1120. The instructions might take the form of executable code that may be executable by HMD device 1100, and/or might take the form of source and/or installable code, which, upon compilation and/or installation on HMD device 1100 (e.g., using any of a variety of generally available compilers, installation programs, compression/decompression utilities, etc.), may take the form of executable code.

In some embodiments, memory 1120 may store a plurality of application modules 1122 through 1124, which may include any number of applications. Application modules 1122-1124 may include particular instructions to be executed by processor(s) 1110. In some embodiments, certain applications or parts of application modules 1122-1124 may be executable by other hardware modules 1180. In certain embodiments, memory 1120 may additionally include secure memory, which may include additional security controls to prevent copying or other unauthorized access to secure information.

In some embodiments, memory 1120 may include an operating system 1125 loaded therein. Operating system 1125 may be operable to initiate the execution of the instructions provided by application modules 1122-1124 and/or manage other hardware modules 1180 as well as interfaces with a wireless communication subsystem 1130 which may include one or more wireless transceivers. Operating system 1125 may be adapted to perform other operations across the components of HMD device 1100 including threading, resource management, data storage control and other similar functionality.

Wireless communication subsystem 1130 may include, for example, an infrared communication device, a wireless communication device and/or chipset (such as a Bluetooth® device, an 1102.11 device, a Wi-Fi device, a WiMax device, cellular communication facilities, etc.), and/or similar communication interfaces. HMD device 1100 may include one or more antennas 1134 for wireless communication as part of wireless communication subsystem 1130 or as a separate component coupled to any portion of the system. Depending on desired functionality, wireless communication subsystem 1130 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1130 may permit data to be exchanged with a network, other computer systems, and/or any other devices described herein. Wireless communication subsystem 1130 may include a means for transmitting or receiving data, such as identifiers of HMD devices, position data, a geographic map, a heat map, photos, or videos, using antenna(s) 1134 and wireless link(s) 1132. Wireless communication subsystem 1130, processor(s) 1110, and memory 1120 may together comprise at least a part of one or more of a means for performing some functions disclosed herein.

Embodiments of HMD device 1100 may also include one or more sensors 1190. Sensor(s) 1190 may include, for example, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input.

HMD device 1100 may include a display module 1160 and a user input module 1170. Display module 1160 may graphically present information, such as images, videos, and various instructions, from HMD device 1100 to a user. Such information may be derived from one or more application modules 1122-1124, one or more other hardware modules 1180, a combination thereof, or any other suitable means for resolving graphical content for the user (e.g., by operating system 1125). Display module 1160 may use liquid crystal display (LCD) technology, light-emitting diode (LED) technology (including, for example, OLED, ILED, mLED, AMOLED, TOLED, etc.), light emitting polymer display (LPD) technology, or some other display technology. User input module 1170 may include, without limitation, a touchscreen, a touch pad, microphone(s), button(s), dial(s), switch(es), and/or the like.

HMD device 1100 may include a camera 1150 that may be used to take photos or videos of a user, for example, for tracking the user's eye position. Camera 1150 may also be used to take photos or videos of the environment, for example, for VR, AR, or MR applications. Camera 1150 may include, for example, a complementary metal-oxide-semiconductor (CMOS) image sensor with a few millions or tens of millions of pixels. In some implementations, camera 1150 may include two or more cameras that may be used to capture 3-D images.

In some embodiments, HMD device 1100 may include a plurality of other hardware modules 1180. Each of other hardware modules 1180 may be a physical module within HMD device 1100. While each of other hardware modules 1180 may be permanently configured as a structure, some of other hardware modules 1180 may be temporarily configured to perform specific functions or temporarily activated. Examples of other hardware modules 1180 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 1180 may be implemented in software.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer-program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A system for interpupillary distance (IPD) adjustment comprising:
    a first nonmoving component;
    a sliding assembly comprising a button; and
    a pair of magnets, wherein a first magnet of the pair of magnets is coupled to the sliding assembly;
    wherein:
        the pair of magnets are configured to exert a magnetic force, in a first direction, on the sliding assembly to press the sliding assembly against the first nonmoving component to lock the sliding assembly to the first nonmoving component; and
        the sliding assembly is configured to, when the button of the sliding assembly is pushed by a force in a second direction opposite the first direction of the magnetic force, disengage with the first nonmoving component and become slidable with respect to the first nonmoving component.

2. The system of claim 1, further comprising a second nonmoving component, wherein:
    the sliding assembly is positioned between the first nonmoving component and the second nonmoving component;
    a second magnet of the pair of magnets is coupled to the second nonmoving component; and
    like poles of the first magnet and the second magnet face each other, wherein the magnetic force repels the sliding assembly towards the first nonmoving component.

3. The system of claim 2, wherein the first magnet and the second magnet are configured such that, when the force in the second direction is below a threshold value, the sliding assembly and the second nonmoving component is separated by an air gap.

4. The system of claim 2, wherein:
    the first nonmoving component includes a slot;
    a first part of the button is received in the slot; and
    a second part of the button extends above the first nonmoving component through the slot,
    wherein the sliding assembly, the first nonmoving component, and the second nonmoving component are configured such that, when a top surface of the button aligns with a top circumference of the slot, the sliding assembly and the second nonmoving component is separated by an air gap.

5. The system of claim 1, further comprising a gear, wherein:
    the sliding assembly further comprises a gear rack; and
    the gear meshes with the gear rack of the sliding assembly and is rotatable by a movement of the gear rack of the sliding assembly.

6. The system of claim 5, wherein:
    the gear is coupled to a display assembly; and
    rotating the gear by the movement of the gear rack of the sliding assembly causes a movement of the display assembly for the IPD adjustment.

7. The system of claim 1, wherein:
    the sliding assembly further comprises a friction pad;
    the first nonmoving component comprises a surface with a plurality of teeth; and
    the magnetic force presses the friction pad against the plurality of teeth to lock the sliding assembly to the first nonmoving component.

8. The system of claim 7, wherein the friction pad comprises a material with an elasticity greater than a threshold value.

9. The system of claim 1, wherein the pair of magnets comprises at least one of a permanent magnet or a electromagnet.

10. The system of claim 1, wherein at least one of the pair of magnets has an elongated shape.

11. The system of claim 1, wherein:
    a second magnet of the pair of magnets is coupled to the first nonmoving component; and
    opposite poles of the first magnet and the second magnet face each other, wherein the magnetic force attracts the sliding assembly to the first nonmoving component to lock the sliding assembly.

12. The system of claim 1, wherein the sliding assembly is configured to be slidable in a direction different from the second direction after the button is pressed by the force in the second direction.

13. An optical device comprising:
    one or more display assemblies; and
    an interpupillary distance (IPD) adjustment system coupled to the one or more display assemblies, the IPD adjustment system comprising:
        a first nonmoving component;
        a sliding assembly comprising a button; and
        a pair of magnets, wherein a first magnet of the pair of magnets is coupled to the sliding assembly;
        wherein:
            the pair of magnets are configured to exert a magnetic force, in a first direction, on the sliding assembly to press the sliding assembly against the first nonmoving component to lock the sliding assembly to the first nonmoving component; and
            the sliding assembly is configured to, when the button of the sliding assembly is pushed by a force in a second direction opposite the first direction of the magnetic force, disengage with the first nonmoving component and become slidable with respect to the first nonmoving component.

14. The optical device of claim 13, wherein:
    the IPD adjustment system further comprises a second nonmoving component;
    the sliding assembly is positioned between the first nonmoving component and the second nonmoving component;
    a second magnet of the pair of magnets is coupled to the second nonmoving component; and
    like poles of the first magnet and the second magnet face each other, wherein the magnetic force repels the sliding assembly towards the first nonmoving component.

15. The optical device of claim 14, wherein the first magnet and the second magnet are configured such that, when the force in the second direction is below a threshold value, the sliding assembly and the second nonmoving component is separated by an air gap.

16. The optical device of claim 13, wherein:
    the sliding assembly further comprises a friction pad, the friction pad comprising a layer of an elastic material;
    the first nonmoving component comprises a surface with a plurality of teeth; and
    the magnetic force presses the friction pad against the plurality of teeth to lock the sliding assembly to the first nonmoving component.

17. The optical device of claim 13, wherein:
    a second magnet of the pair of magnets is coupled to the first nonmoving component; and opposite poles of the first magnet and the second magnet face each other, wherein the magnetic force attracts the sliding assembly to the first nonmoving component to lock the sliding assembly.

18. The optical device of claim 13, wherein:
the sliding assembly further comprises a gear rack;
the IPD adjustment system further comprises a gear, the gear coupled to the one or more display assemblies and meshed with the gear rack of the sliding assemble; and
the gear is rotatable by a movement of the gear rack of the sliding assembly to cause a movement of the one or more display assemblies for adjusting an IPD of the optical device.

19. A method for adjusting an interpupillary distance of an optical device, the method comprising:
pressing, by a pair of magnets, a sliding assembly against a first nonmoving component of an interpupillary distance (IPD) adjustment system to engage the sliding assembly with the first nonmoving component;
in response to pressing the sliding assembly by a user, disengaging the sliding assembly from the first nonmoving component; and
applying, by the pair of magnets, a magnetic repulsion force or a magnetic attraction force on the sliding assembly to prevent the sliding assembly being pressed from contacting a second nonmoving component.

20. The method of claim 19, further comprising:
in response to sliding the sliding assembly relative to the first nonmoving component by the user, causing a rotation of a gear meshed with a gear rack on the sliding assembly, wherein the rotation of the gear causes a movement of a display assembly to adjust the IPD.

* * * * *

UNITED STATES PATENT AND TRADEMARK OFFICE
CERTIFICATE OF CORRECTION

PATENT NO. : 10,386,647 B1  
APPLICATION NO. : 15/647112  
DATED : August 20, 2019  
INVENTOR(S) : Michael Xingyi Yu et al.

Page 1 of 1

It is certified that error appears in the above-identified patent and that said Letters Patent is hereby corrected as shown below:

On the Title Page

In the Assignee section. item (73), delete "Facebook, Inc., Menlo Park, CA (US)" and insert -- Facebook Technologies, LLC, Menlo Park, CA (US) --, therefor.

Signed and Sealed this  
Tenth Day of March, 2020

Andrei Iancu  
*Director of the United States Patent and Trademark Office*